United States Patent Office 3,849,437
Patented Nov. 19, 1974

3,849,437
NITROGEN-CONTAINING COMPOUNDS
John Clark Ousby and William Brian Turner, Macclesfield, England, assignors to Imperial Chemical Industries Limited, London, England
No Drawing. Continuation-in-part of abandoned application Ser. No. 607,905, Jan. 9, 1967. This application Jan. 16, 1968, Ser. No. 698,131
Claims priority, application Great Britain, Jan. 31, 1966, 4,182/66
Int. Cl. A61k 21/00
U.S. Cl. 260—325       4 Claims

ABSTRACT OF THE DISCLOSURE

The disclosure relates to the two antibiotic products 1-benzyl - 3a,4,5,7a - tetrahydro-5-hydroxy-6,7-dimethyl-3a,4 - (11 - acetoxy-8-hydroxy-6,8-dimethyl-7-oxocycloundeca-3,9 - dieno)isoindoline-3-one and 1-benzyl-3a,4,5,6,7,7a-hexahydro-5-hydroxy-7-methyl - 6 - methylene-3a,4-(11-acetoxy - 8 - hydroxy - 6,8 - dimethyl-7-oxocycloundeca - 3,9 - dieno)isoindoline-3-one, and to a fermentation process for obtaining the said compounds. The compounds produce profound effects on cells growing in tissue culture.

This application is a continuation-in-part of Ser. No. 607,905, filed Jan. 9, 1967, and now abandoned.

This invention relates to new nitrogen-containing compounds and more particularly it relates to novel antibiotic products which produce effects on tissue culture cells characterised by inhibition of cytoplasmic cleavage and of cell motility. The compounds may therefore be used in the study of cytological processes.

According to the invention we provide the novel antibiotic products which have the formula:

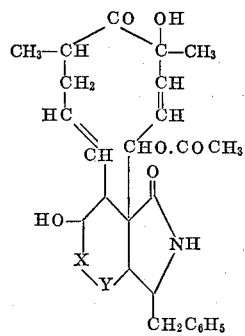

wherein the group

represents the group

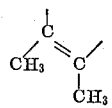

or the group

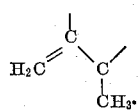

The compound wherein the group

represents the group

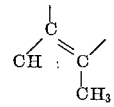

is hereinafter referred to as MM.54, and it is also known as cytochalasin C. A systematic name for this compound is 1-benzyl-3a,4,5,7a-tetrahydro - 5 - hydroxy - 6,7 - dimethyl-3a,4-(11 - acetoxy - 8 - hydroxy-6,8-dimethyl-7-oxocycloundeca-3,9-dieno)isoindoline - 3 - one. The compound MM.54 has a molecular formula of $C_{30}H_{37}NO_6$ and has a melting point of 260–264° C. It has a constant and characteristic infra-red absorption spectrum which shows $\nu_{max}$ (liquid paraffin); 3402 (m), 3186 (w), 3120 (w), 1743 (s), 1708 (s) and 1602 (w) cm.$^{-1}$. It shows no selective absorption in the ultra-violet spectrum between 210 m$\mu$ and 350 m$\mu$.

Hydrolysis of MM.54 with ethanolic alkali solution yields a carboxylic acid of the formula:

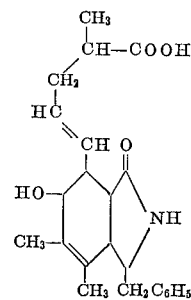

The said carboxylic acid has a molecular formula $C_{23}H_{29}NO_4$ and a melting point of 162–165° C. It shows infra-red absorption bands with $\nu_{max}$ (liquid paraffin): 3510 (m), 3265 (s), 2700 (broad), 1705 (broad), 1650 (shoulder) and 1605 (w), and shows no selective absorption in the ultra-violet spectrum between 210 m$\mu$ and 350 m$\mu$.

The compound wherein the group

represents the group

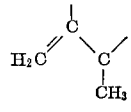

is hereinafter referred to as MM.73, and it is also known as cytochalasin D. A systematic name for this compound is 1-benzyl-3a,4,5,6,7,7a hexahydro-5-hydroxy-7-methyl-6-methylene-3a,4-(11-acetoxy-8-hydroxy - 6,8 - dimethyl-7-oxocycloundeca-3,9-dieno) - isoindoline-3-one. The compound MM.73 has a molecular formula of $C_{30}H_{37}NO_6$ has a melting point of 248–252° C. Its infra-red absorption spectrum shows $\nu_{max}$ (liquid paraffin): 3413 (m), 3219 (w), 1744 (s), 1707 (s), 1695 (s) and 1644 (w) cm.$^{-1}$. It shows no selective absorption in the ultra-violet spectrum between 210 m$\mu$ and 350 m$\mu$.

It is to be understood that the symbol $s$, $m$ or $w$ when applied to an infra-red absorption band indicates that the intensity of the band is strong, medium or weak respectively.

According to a further feature of the invention we provide a process for the manufacture of the antibiotic products MM.54 and MM.73 which comprises cultivation of an active strain of the organism *Metarrhizium anisopliae* in an aqueous nutrient medium followed by isolation of the desired products from the culture filtrate.

As a suitable strain of organism to be used in the above process there may be mentioned, for example, *Metarrhizium anisopliae* originating from the Commonwealth Mycological Institute located at Kew, England, and identified as IMI 98373.

The aqueous nutrient medium contains a source of assimilable carbon and a source of assimilable nitrogen. Suitable assimilable sources of carbon may be, for example, a polyhydric alcohol, for example, sucrose, glucose or glycerol, a source of polymerised carbohydrate, for example starch; or naturally-occurring or synthetic oils and fats. The carbon source is generally present in the medium within the range of 0.1–30% by weight and preferably within the range of 2–8% by weight. Suitable assimilable sources of nitrogen may be an inorganic source or an organic source. It may conveniently be provided initially in the form of, for example, a nitrate of an alkali metal or an alkaline earth metal, or an ammonium salt of an inorganic acid or an organic acid, for example, sodium potassium, calcium or ammonium nitrate or ammonium tartrate, ammonium sulphate or ammonium phosphate. It may also be an amino-acid, for example glycine, a seed meal, for example cottonseed meal, or corn steep liquor, peptone, urea, yeast extract or meat extracts. The nitrogen source is generally present in the medium in an amount such that there is present between 0.001% and 1.0%, and preferably between 0.01% and 0.5% of elementary nitrogen in the medium. The medium usually contains smaller quantities of essential elements such as phosphorus (potassium dihydrogen phosphate or di-ammonium hydrogen phosphate), magnesium (magnesium sulphate or magnesium carbonate), sulphur (a sulphate) and potassium (potassium chloride or potassium carbonate) and minute quantities of so-called trace elements such as iron, manganese, zinc, molybdenum or copper.

As suitable aqueous nutrient media there may be mentioned, for example, (i) an aqueous medium containing 2.5% glucose, 0.266% tartaric acid, 0.266% ammonium tartrate, 0.04% ammonium phosphate, 0.04% potassium carbonate, 0.027% magnesium carbonate, 0.016% ammonium sulphate, 0.0042% zinc sulphate and 0.0042% ferrous sulphate, (ii) an aqueous medium containing 3.0% glucose, 0.25% bactotryptone, 0.1% potassium dihydrogen phosphate, 0.05% magnesium sulphate and 0.05% potassium chloride and (iii) an aqueous medium containing 5.0% glucose, 0.2% sodium nitrate, 0.1% potassium dihydrogen phosphate, 0.05% magnesium sulphate and 0.001% ferrous sulphate, the media (ii) and (iii) also containing minute quantities of trace elements such as iron, manganese, zinc, molybdenum or copper.

The cultivation of the organism may be carried out within the temperature range of 15–35° C., preferably at a temperature of about 24° C., and growth of the organism is generally complete after 13–15 days.

The desired antibiotic products MM.54 and MM.73 are present in the culture filtrate and may be isolated by filtration of the culture medium followed by extraction of the culture filtrate with an organic solvent such as chloroform, thereby providing a solution of the mixed products. Further separation and purification may be carried out by means of chromatography using an absorption column of silica gel or alumina and elution solvents which are chloroform, benzene, mixtures of chloroform and benzene or mixtures of ethyl acetate and petroleum ether (b.p. 60–80° C.).

The antibiotic products MM.54 and MM.73 both produce profound effects on cells growing in tissue culture, as shown by the following experiments:

(a) MM.54 was ball-milled with Eagle's tissue culture medium to provide a dispersion containing 0.05 part per million of MM.54. 0.5 ml. of this dispersion was added to a culture of approximately 100,000 Earle's "L" strain mouse cells growing on glass and the mixture was incubated for 24 hours at 37° C. The majority of the cells were found to contain two nuclei, whereas control cultures incubated under the same conditions without the addition of MM.54 contained only 3% binucleate cells. Observation of the treated cells by time-lapse cinematography showed that the effect was caused by prevention of cytoplasmic cleavage after the nucleus had divided normally. The same effects were observed if MM.73 was used in place of MM.54.

(b) Living mouse cells of Earle's "L" strain were treated with a dispersion containing 0.05 part per million of MM.54 or MM.73 in Eagle's tissue culture medium, and the resulting culture was observed by time-lapse cinematography. Under these conditions all motility was completely inhibited. The culture chamber was then perfused with normal medium until substantially all the MM.54 or MM.73 was removed. Normal cell movement was resumed, the cells showing no apparent permanent damage.

The antibiotic products MM.54 and MM.73 are therefore useful as tools in the study of cytological processes with which they interfere, in particular the study of the process of cytoplasmic cleavage and of cell movement.

The invention is illustrated but not limited by the following Examples:

Example 1

An aqueous nutrient medium is made up containing the following ingredients:

| | Percent w./v. |
|---|---|
| Tartaric acid | 0.266 |
| Mono-ammonium tartrate | 0.266 |
| Di-ammonium hydrogen phosphate | 0.04 |
| Potassium carbonate | 0.04 |
| Magnesium carbonate [$3MgCO_3$, $Mg(OH)_2$, $3H_2O$] | 0.027 |
| Ammonium sulphate | 0.016 |
| Zinc sulphate heptahydrate | 0.0042 |
| Ferrous sulphate heptahydrate | 0.0042 |
| Dextrolact | 2.5 |
| Yeast extract ("Difco" brand; "Difco" is a Registered trademark) | 0.01 |

This medium is placed in ceramic fermentation vessels (each one containing 1 litre of medium) and aqueous 5N-potassium hydroxide solution is added to the medium to adjust it to a pH of 6.0 The medium is sterilised by autoclaving and the pH is then 5.5. The medium is inoculated with 2 ml. of an inoculum of *Metarrhizium anisopliae* IMI 98373 previously grown in a bottle slant on potato dextrose agar for 14 days.

The fermentation is carried out at a temperature of 24° C. for 13–15 days. The medium is then filtered and the culture filtrate (30 litres), which has a pH of 3.4, is adjusted to a pH of 7.0 with aqueous 5N-potassium hydroxide solution and is then extracted three times with chloroform using 3 litres each time. The chloroform solution is evaporated to dryness under reduced pressure and the brown semi-solid residue (2.2 g.) is combined with other similar extracts until a total of 7.47 g. is obtained. The combined material is dissolved in acetone (200 ml.) and the solution is added to silica gel (75 g.). The mixture is stirred and heated to remove the acetone and the resulting dry silica gel is placed on top of a column (diameter=6.0 cm.) of silica gel (300 g. made up in benzene. The column is eluted successively with benzene, a mixture of benzene and chloroform (9:1 v./v.) and a mixture of benzene and chloroform (4:1 v./v.), and the small amounts of yellow oils (0.65 g.) so obtained are discarded. The column is then eluted successively with six 750 ml. fractions of a mixture of benzene and chloroform (1:1 v./v., two 750 ml. fractions of a mixture of benzene and chloroform (1:3 v./v.) and nine 750 ml. fractions of chloroform. The fractions are examined by thin-layer chromatography on silica gel plates using a mixture of methylene chloride, formic acid and ethanol (89:5:6 v./v./v.) as solvent. The products present in each fraction are detected by spraying the plates with ethanolic sulphuric acid and heating the sprayed plates at 100° C. for 5 minutes, whereupon the spot corresponding to the product MM.54 produces an orange fluorescence, and the spot corresponding to the product MM.73 produces a yellow fluorescence. Earlier fractions contain MM.54, and these fractions are combined and evaporated to dryness and the residue therefrom is crystallised from acetone. There are thus obtained fine needles of MM.54 (0.74 g.), m.p. 260–264° C., which analyses for carbon, 71.0%; hydrogen, 7.3%; and nitrogen 2.8%. The molecular formula $C_{30}H_{37}NO_6$ requires carbon, 71.0%; hydrogen 7.35%; and nitrogen 2.8%. The molecular weight of MM.54 as determined by mass spectrometry is 507. The molecular formula $C_{30}H_{37}NO_6$ requires a molecular weight of 507.

The later fractions from the column contain MM.54 with increasing amounts of MM.73. These fractions are evaporated to dryness and the residues are fractionally crystallised from acetone. There are thus obtained needles of MM.73, m.p. 248–252° C., which analyses for carbon, 70.7%; hydrogen, 7.3%. The molecular formula $$C_{30}H_{37}NO_6$$

requires carbon 71.0%; hydrogen, 7.35%. The molecular weight of MM.73 as determined by mass spectrometry is 507.

Example 2

A suspension of 0.31 g. of MM.54 in a mixture of 20 ml. of ethanol and 30 ml. of aqueous 3N-sodium hydroxide solution is heated under reflux in an atmosphere of hydrogen for 75 minutes. The ethanol is removed by evaporation under reduced pressure and the residue is acidified with concentrated aqueous hydrochloric acid. The mixture is extracted with chloroform and the extract is dried and evaporated to dryness. There is thus obtained 0.294 g. of mixed hydrolysis product as a gum. The gum is dissolved in chloroform and the solution is extracted with aqueous sodium hydrogen carbonate solution. The alkaline extract is acidified and the mixture is extracted with chloroform. The extract is dried and evaporated to dryness and the residue, which weighs 0.22 g., is crystallised from a mixture of acetone and petroleum ether. There is thus obtained a carboxylic acid, m.p. 162–165° C., which analyses for carbon, 72.05%; hydrogen 7.5%; and nitrogen 3.7%. The molecular formula $C_{23}H_{29}NO_4$ requires carbon 72.0%; hydrogen 7.6%; and nitrogen 3.65%. The molecular weight of the carboxylic acid as determined by mass spectrometry is 383. The molecular formula $C_{23}H_{29}NO_4$ requires a molecular weight of 383.

What we claim is:
1. An antibiotic product which has the formula:

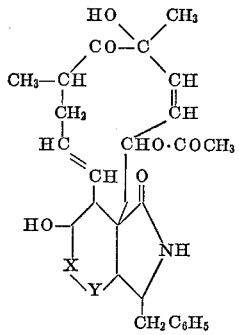

wherein the group

represents the group

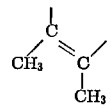

or the group

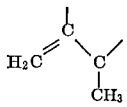

2. The compound claimed in claim 1 which is 1-benzyl-3a,4,5,7a - tetrahydro - 5-hydroxy-6,7-dimethyl-3a,4-(11-acetoxy - 8 - hydroxy-6,8-dimethyl-7-oxocycloundeca-3,9-dieno)isoindoline-3-one.
3. The compound claimed in claim 1 which is 1-benzyl-3a,4,5,6,7,7a-hexahydro - 5 - hydroxy-7-methyl-6-methylene-3a,4-(11-acetoxy - 8 - hydroxy-6,8-dimethyl-7-oxocycloundeca-3,9-dieno)isoindoline-3-one.
4. A process for the manufacture of the antibiotic products claimed in claim 1 which comprises cultivation of the organism *Metarrhizium anisopliae* strain IMI 98373 in an aqueous nutrient medium until substantial antibiotic activity is imparted to said medium, isolation of the products from the culture filtrate, and separation of the products one from the other.

References Cited

Carter: Nature, Jan. 21, 1967, pp. 261–4.

JEROME D. GOLDBERG, Primary Examiner

U.S. Cl. X.R.

195—81